Patented Jan. 24, 1939

2,144,612

UNITED STATES PATENT OFFICE 2,144,612

PREPARATION OF GLYCEROL DICHLOROHYDRIN

Edgar C. Britton and Roy Lyman Heindel, Midland, Mich., assignors to The Dow Chemical Company, Midland, Mich., a corporation of Michigan No Drawing. Application September 10, 1936, Serial No. 100,210

19 Claims. (Cl. 260—633)

This invention concerns the use of organic solvents in the preparation of glycerol dichlorohydrin (alpha).

While it is old to react glycerol with hydrogen chloride in the presence of a suitable catalyst such as acetic acid to form glycerol dichlorohydrin and two molecules of water, the known processes either allow the water of reaction to accumulate, favoring equilibrium conditions long before complete reaction can be obtained, or drive the water out of the reaction mixture by conducting the reaction at elevated temperatures, i. e., approximately 120° C. or higher. If the water of reaction be allowed to accumulate in the process, there is obtained on fractional distillation of the product a substantial fraction composed of water, hydrogen chloride, acetic acid, and glycerol dichlorohydrin, from which the desired dichlorohydrin product is very difficult of recovery. When the water is distilled out of the reaction at elevated temperatures considerable amounts of chlorohydrin glycerides, resinous polymers, and similar high boiling and undesirable residues are produced. Furthermore, when water is so removed there is also carried over in the vapors leaving the reaction zone appreciable quantities of glycerol dichlorohydrin and hydrogen chloride, to form an aqueous acid distillate solution from which the glycerol dischlorohydrin has heretofore not been conveniently removable.

We have discovered that when hydrogen chloride is reacted with glycerol at a suitable temperature and in the presence of an inert, water-immiscible organic solvent in which the dichlorohydrin product is soluble, (1) little or no residue is formed, (2) the reaction may be readily carried to completion, (3) the solution of glycerol dichlorohydrin obtained as the reaction product is substantially free from water, and (4) loss of glycerol dichlorohydrin in difficultly separable aqueous acid solution is minimized. The solvent employed is of necessity inert to the other reactants, that is, must not contain hydroxyl, amino, carboxyl, or other groups which would tend to form undesired by-products during reaction; and is preferably of such a type as to withstand hydrolysis during the reacting and distilling steps.

In carrying out the reaction, glycerol and the solvent are mixed together in a suitable reaction vessel, together with a catalyst such as formic or acetic acid, and hydrogen chloride reacted therewith at temperatures varying with the particular solvent employed, to produce glycerol dichlorohydrin and water. The amount of catalyst preferably employed varies between about 2 and 5 per cent by weight of the glycerol employed. The reaction is generally carried out at approximately the steam-distillation temperature of the reaction mixture but not appreciably in excess of 100° C., thereby continuously distilling out a mixture composed of water, a portion of the solvent employed, and a small quantity of the dichlorohydrin product, which ternary mixture carries in solution hydrogen chloride and small amounts of catalyst. This continuous distillation of a portion of the reaction mixture provides a convenient means for controlling the temperature of reaction which had been found to approximate the temperature of the vapor mixture leaving the reaction zone. This distillate, henceforth termed the "acid fraction", on standing forms two layers, one comprising the organic solvent and the other the aqueous hydrochloric acid. The organic solvent layer may be separated therefrom in any convenient manner and returned to the reaction zone, and serves as an extractant to remove the greater portion of the dichlorohydrin product from the aqueous hydrochloric acid solution, which tends to dissolve the same. If desired, the aqueous acid layer which contains traces of dichlorohydrin may be either extracted with organic solvent to recover residual product and then rejected, or may be returned in toto to the reactor for digestion with the next reaction batch. This digestion, accomplished at 80° to 90° C., recovers hydrogen chloride, acetic acid, and glycerol dichlorohydrin from the water, which may thereafter be distilled out and discarded prior to introduction of additional hydrogen chloride into the reaction zone.

The step of introducing hydrogen chloride into the reaction mixture may, although not necessarily, be continued until substantially all of the glycerol has been reacted to glycerol dichlorohydrin, after which the reaction mixture is cooled, blown with air to remove excess dissolved hydrogen chloride, and the glycerol dichlorohydrin separated therefrom, as by distillation, if desired. It is frequently convenient to react further upon the above dichlorohydrin solution prior to the separation step, to form derivatives thereof such as epichlorohydrin, etc. The organic solvent may be recovered in substantially quantitative amounts by fractional distillation from the glycerol dichlorohydrin which is obtained as a major product from the reaction. Higher boiling residues consisting essentially in mono-chlorohydrin and small portions of unreacted glycerol may be used as starting material in later runs.

The following examples illustrate the use of certain representative organic solvents, but are not to be construed as limiting the invention:—

*Example 1*

Gaseous hydrogen chloride was reacted with a mixture of 960 grams (10 moles) of 96 per cent glycerol, 50 grams (0.83 mole) of acetic acid, and 478 grams of normal dibutyl ether, thereby forming water and the glycerol chlorohydrins. The reaction was carried out by bubbling the hydrogen chloride into and through the reaction mixture under atmospheric pressure and at the steam-distillation temperature of the mixture, i. e. in the neighborhood of 100° C., whereby steam distillation occurred and the water of reaction was removed substantially as formed. The hydrogen chloride addition was continued for approximately 35 hours, at the end of which time no more water distilled from the reaction mixture and the temperature of the vapors leaving the reaction zone tended to rise above 105° C. The distillate from the reaction, comprising water, dibutyl ether, small quantities of glycerol dichlorohydrin, dissolved hydrogen chloride, and traces of acetic acid catalyst, was collected as an acid fraction, which separated into two layers. The upper or dibutyl ether layer served as an extractant to remove the major portion of the glycerol dichlorohydrin from the lower or aqueous acid layer, which tended to dissolve the same, and was continuously separated and returned to the reaction zone. Following the completion of the reaction, the 754 grams of residual aqueous acid layer, having a specific gravity of 1.190 at 15° C. and containing 37 per cent by weight hydrogen chloride, was found by titration to contain 12.9 grams of dissolved dichlorohydrin. The dibutyl ether solution of reaction product was fractionally distilled, whereby 1111 grams (8.7 moles) of glycerol dichlorohydrin was obtained as a major product. 78 grams of higher boiling distillable residue from the fractionation consisted essentially in a mixture of glycerol monochlorohydrin and unreacted glycerol and was utilized as a starting material in later runs. Aside from certain mechanical losses, the dibutyl ether was recovered substantially quantitatively.

*Example 2*

In a similar manner gaseous hydrogen chloride was reacted with 960 grams (10 moles) of 96 per cent by weight glycerol in the presence of 48 grams (0.8 mole) of acetic acid and 850 grams of ethylene dichloride, at approximately 83° C., the distillation temperature of the mixture. The 722.3 grams of aqueous acid layer remaining as a residue in the continuous separator had a specific gravity of 1.191 at 15° C., contained 35.8 per cent hydrogen chloride, and was found on titration to contain 25 grams of dissolved glycerol dichlorohydrin. This acid solution was adapted to be used in subsequent runs by digesting the same with fresh glycerol prior to the step of reacting additional hydrogen chloride therewith. Fractional distillation of the crude ethylene dichloride-glycerol dichlorohydrin product obtained, yielded as a major product 1074 grams (8.35 moles) of substantially pure glycerol dichlorohydrin. 200 grams of a difficultly separable mixture of glycerol mono- and dichlorohydrin and unreacted glycerol were recovered as a higher boiling fraction while non-distillable residue amounted to less than 5 grams Aside from mechanical losses the ethylene dichloride was recovered substantially quantitatively.

*Example 3*

A mixture of 960 grams (10 moles) of 96 per cent glycerol, 48 grams (0.8 mole) of acetic acid, and 850 grams of propylene dichloride was reacted with gaseous hydrogen chloride, substantially as described, at the steam-distillation temperature of the mixture, i. e. at approximately 90° C. The propylene chloride-glycerol dichlorohydrin layer of the acid fraction, resulting from the steam-distillation of the reaction mixture, was periodically separated from the aqueous acid layer of said fraction and returned to the reaction zone. Following the completion of the reaction the 640 grams of aqueous acid layer accumulated in the acid fraction separator was found to have a specific gravity of 1.172 and to contain 29.5 per cent hydrogen chloride. Titration of this acid layer indicated that it contained no glycerol dichlorohydrin in solution. Fractional distillation of the propylene dichloride-glycerol dichlorohydrin reaction mixture resulted in a substantially quantitative recovery of the propylene dichloride and in the isolation of 1173 grams (9.1 moles) of glycerol dichlorohydrin. 81.5 grams of a high boiling mixture of glycerol monochlorohydrin and unreacted glycerol were returned as a starting material to a later run.

*Example 4*

188 grams (2.04 moles) of glycerin, 165 grams of chlorobenzol, and 168 grams of an aqueous acid layer from a previous run having a specific gravity of 1.200 at 20°/4° C., containing 35.9 per cent hydrogen chloride, 1.25 per cent acetic acid, 11.7 per cent glycerol dichlorohydrin, and 51.2 per cent water, were mixed together and digested for 3 hours at a temperature of 90° to 95° C. 70 grams (0.6 mole) of glycerol monochlorohydrin recovered from a previous run was then added to the digestion product, bringing the amount of glycerine derivatives present in the mixture to 2.78 moles. An additional 10 grams of acetic acid catalyst was added to the reaction mixture and gaseous hydrogen chloride was introduced thereinto under atmospheric pressure and at the steam-distillation temperature of the mixture, that is, 100° to 105° C., until no more water was formed in the reaction. The steam-distillate from the reaction was condensed as an acid fraction and the water-immiscible layer thereof, comprising the chlorobenzene and extracted glycerol dichlorohydrin, returned to the reaction zone during the process. 321 grams of residual acid layer remaining in the separator after the completion of the reaction, had a specific gravity of 1.17 at 15°/4° C. and contained in solution 27.3 per cent hydrogen chloride, 3.6 per cent acetic acid, and 48.3 grams of glycerol dichlorohydrin. Distillation of the mixed reaction products yielded as a major product 299.6 grams (2.32 moles) of glycerol dichlorohydrin. 27 grams of high boiling distillable residue was found to be a reusable mixture of glycerol monochlorohydrin and unreacted glycerol.

*Example 5*

Gaseous hydrogen chloride was reacted with a mixture of 460 grams (4.8 moles) of 96 per cent glycerol, 23 grams (0.38 mole) of acetic acid, and 521.5 grams of orthodichlorobenzene. The reaction was carried out at 90° C. ±5° (the steam-distillation temperature of the mixture) whereby the water of reaction was removed substantially as formed. The hydrogen chloride addition was continued until no more water was formed in the reaction and the temperature of the vapors leaving the reaction vessel tended to rise above 100° C. The mixture resulting from the continuous steam-distillation of the water of reaction, comprising orthodichlorobenzene, glycerol dichlorohydrin, and HCl, was collected in a cooling chamber. The orthodichlorobenzene layer with the major portion of the glycerol dichlorohydrin dissolved therein was periodically separated from the aqueous acid layer of said acid fraction. On completion of the reaction the accumulated aqueous acid layer was found to consist in 392 grams of 31.9 per cent hydrochloric acid solution having a specific gravity of 1.223 at 15°/4° C. and containing 78.6 grams of glycerol dichlorohydrin by titration. This acid solution was utilized as a beginning material in later runs.

No attempt was made to fractionally distill the 1035 grams of substantially water-free glycerol dichlorohydrin - orthodichlorobenzene solution which was obtained as a major product in the reaction. This material had a specific gravity of 1.310 at 15°/4° C. and analysis by titration indicated that it contained 536 grams (4.16 moles) of glycerol dichlorohydrin. The entire solution was utilized as a starting material in the preparation of epichlorohydrin.

*Example 6*

The 45 pounds of high boiling residue obtained from the preparation of glycerol dichlorohydrin by a plant scale run using orthodichlorobenzene as the solvent, was found by analysis to contain 37 pounds of glycerol monochlorohydrin and 8 pounds of unreacted glycerol. This unrefined mixture was mixed with fresh glycerol and employed as a starting material in a subsequent run, from which was obtained 43 pounds of residue apparently consisting in 36 pounds of glycerol monochlorohydrin and 7 pounds of unreacted glycerol. This material was similarly employed in yet another run, which yielded, in addition to glycerol dichlorohydrin, 41 pounds of residue, which proved to contain 36.2 pounds of glycerol monochlorohydrin and 4.8 pounds of unreacted glycerol. No substantial increase in the amount of high boiling fraction was observed in the second and third runs, which is indicative of the degree to which the formation of undesired polymers and tarry by-products, i. e. unusable residues, is controlled through the use of the solvent.

Aqueous hydrochloric acid solution may be substituted for the gaseous hydrogen chloride employed in the above examples, the additional water thereby introduced into the reaction zone being continuously removed, along with water of reaction, by steam-distillation with a portion of the solvent. If desired, the reaction may be carried out under sub-atmospheric or superatmospheric pressures, although such procedure in plant operation introduces certain problems in apparatus construction not encountered under atmospheric conditions.

Mixtures of solvents, for example chlorobenzene and ethylene chloride, dibutyl ether and propylene chloride, etc., may be employed in a manner similar to that described in the foregoing examples. Or, if desired, a solvent other than that used as reaction medium may be employed for extracting the residual product from the aqueous-acid layer of the acid fraction. For example, in a run employing chlorobenzene as reaction medium, normal-butyl ether may advantageously be used for extracting residual glycerol dichlorohydrin from the hydrochloric acid layer of the acid fraction because of its high extraction coefficient and low solubility in acid solution as compared to the low extraction coefficient and relatively high solubility of the chlorobenzene.

Other organic solvent materials may be employed as reaction media in the preparation of glycerol dichlorohydrin provided only that they be inert to the reactants involved in and the products produced by said reaction and are solvents for glycerol dichlorohydrin. Among those solvents found particularly suitable are (1) the aromatic hydrocarbons such as benzene and its homologues toluene, xylene, durene fractions, etc., (2) aromatic hydrocarbon derivatives such as trichlorobenzene, anisole, and phenetole, (3) the dialkyl ethers such as di-isopropyl ether, the amyl ethers, and the chloroethyl ethers, (4) the halo-aliphatic compounds such as the butyl, amyl, and hexyl chlorides, 1,1,2-trichloro-ethane, 1,2-dichloro-n-butane, carbon tetrachloride, tri-chloroethylene, tetrachloro-ethylene, etc., or mixtures of the same.

Although the foregoing examples describe the preparation of glycerol dichlorohydrin as a batch process, in plant operation the preparation can be conveniently carried out in a continuous manner. This may be accomplished by continuously withdrawing a portion of a substantially reacted mixture, separating therefrom the desired glycerol dichlorohydrin product, as by fractional distillation, and returning to the reaction zone recovered solvent, unreacted glycerol, glycerol monochlorohydrin and acetic acid catalyst, while continuously adding fresh glycerol to the reaction vessel in amount equivalent to the glycerol-dichlorohydrin product removed and additional acetic acid catalyst as made necessary by loss of said catalyst in the aqueous layer of the acid fraction. The separation of solvent and glycerol-dichlorohydrin from the acid fraction, as previously pointed out, can be readily accomplished through the use of any continuous separation method which will serve to return the organic constituents to the reaction zone and to discard the aqueous acid portion of the mixture substantially free from valuable reaction products.

Other modes of applying the principle of our invention may be employed instead of those explained, change being made as regards the methods herein disclosed, provided the step or steps stated by any of the following claims or the equivalent of such stated step or steps be employed.

We therefore particularly point out and distinctly claim as our invention:—

1. In the preparation of glycerol dichlorohydrin from hydrogen chloride and glycerol, the step which consists in carrying out the reaction in the presence of an inert, water-immiscible organic solvent for the glycerol dichlorohydrin, and at the steam distillation temperature of the reaction mixture under the prevailing pressure.

2. In the preparation of glycerol dichlorohydrin, the step which consists in reacting hydrogen chloride with glycerol at a temperature not substantially in excess of 100° C. in the presence of a water-immiscible organic solvent for the glycerol dichlorohydrin, and continuously distilling the water of reaction out of the mixture.

3. In the preparation of glycerol dichlorohydrin, the steps which consist in reacting hydrogen chloride with glycerol in the presence of a catalytic amount of an aliphatic carboxylic acid in a reaction medium consisting of a water-immiscible organic solvent for the glycerol dichlorohydrin, and removing the water produced by the reaction substantially as formed.

4. In the preparation of glycerol dichlorohydrin from hydrogen chloride and glycerol, the step which consists in carrying out the reaction in the presence of an inert, water-immiscible halogen-containing organic solvent for the glycerol dichlorohydrin, and at the steam distillation temperature of the reaction mixture under the prevailing pressure.

5. In the preparation of glycerol dichlorohydrin from hydrogen chloride and glycerol, the step which consists in carrying out the reaction at a temperature not substantially in excess of 100° C. in the presence of a water-immiscible halogen-containing organic solvent for the glycerol dichlorohydrin, and continuously distilling the water of reaction out of the mixture.

6. In the preparation of glycerol dichlorohydrin, the step which consists in passing gaseous hydrogen chloride through a mixture of glycerol and an inert, water-immiscible solvent for the glycerol dichlorohydrin in the presence of catalytic amounts of acetic acid and continuously distilling off water substantially as formed in the reaction.

7. In the preparation of glycerol dichlorohydrin, the step which consists in passing gaseous hydrogen chloride through a mixture of glycerol and an inert, water-immiscible solvent for the glycerol dichlorohydrin in the presence of catalytic amounts of acetic acid and continuously distilling off water substantially as formed in the reaction in conjunction with glycerol dichlorohydrin, hydrogen chloride, and the solvent employed.

8. In the preparation of glycerol dichlorohydrin, the step which consists in passing gaseous hydrogen chloride through a mixture of glycerol and an inert- water-immiscible solvent for the glycerol dichlorohydrin in the presence of catalytic amounts of acetic acid, continuously distilling off water substantially as formed in the reaction in conjunction with glycerol dichlorohydrin, hydrogen chloride, and the solvent employed, and separating the organic constituents from said acid distillate.

9. In a method for the preparation of glycerol dichlorohydrin, the step which consists in passing gaseous hydrogen chloride through a mixture of glycerol, a catalytic amount of an aliphatic carboxylic acid and an inert, water-immiscible organic solvent for glycerol dichlorohydrin maintained at substantially the steam-distillation temperature of the reaction mixture.

10. In a method for the preparation of glycerol dichlorohydrin, the steps which consist in passing gaseous hydrogen chloride through a mixture of glycerol, a catalytic amount of an aliphatic carboxylic acid, and an inert, water-immiscible organic solvent for glycerol dichlorohydrin maintained at substantially the steam-distillation temperature of the reaction mixture, continuously distilling off water substantially as formed in the reaction together with hydrogen chloride, the solvent employed, and relatively small portions of glycerol dichlorohydrin, separating the organic constituents from said acid distillate, and returning them to the reaction zone.

11. In the preparation of glycerol dichlorohydrin in the presence of a suitable catalyst, the step which consists in removing water from the reaction zone by carrying out the reaction in the presence of a water-immiscible organic solvent for the glycerol dichlorohydrin and at the steam-distillation temperature of the reaction mixture.

12. In the preparation of glycerol dichlorohydrin from hydrogen chloride and glycerol, the step which consists in carrying out the reaction in the presence of ethylene dichloride, and at the steam distillation temperature of the reaction mixture.

13. In the preparation of glycerol dichlorohydrin, the step which consists in reacting hydrogen chloride with glycerol at a temperature not substantially in excess of 100° C. in the presence of ethylene dichloride, and continuously distilling off water substantially as formed in the reaction.

14. In the preparation of glycerol dichlorohydrin, the step which consists in passing gaseous hydrogen chloride through a mixture of glycerol and ethylene dichloride in the presence of catalytic amounts of acetic acid, continuously distilling off water substantially as formed in the reaction, together with glycerol dichlorohydrin, hydrogen chloride, and ethylene dichloride, separating the organic constituents from said acid distillate, and returning them to the reaction zone.

15. In the preparation of glycerol dichlorohydrin from hydrogen chloride and glycerol, the step which consists in carrying out the reaction in the presence of di-normal-butyl-ether.

16. In the preparation of glycerol dichlorohydrin, the step which consists in reacting hydrogen chloride with glycerol at a temperature not substantially in excess of 100° C. in the presence of di-normal-butyl-ether.

17. In the preparation of glycerol dichlorohydrin, the step which consists in passing gaseous hydrogen chloride through a mixture of glycerol and di-normal-butyl-ether in the presence of catalytic amounts of acetic acid, continuously distilling off water substantially as formed in the reaction, together with glycerol dichlorohydrin, hydrogen chloride, and di-normal-butyl-ether, separating the organic constituents from said distillate, and returning them to the reaction zone.

18. In the preparation of glycerol dichlorohydrin, the step which consists in reacting hydrogen chloride with glycerol at a temperature not substantially in excess of 100° C. in the presence of liquid chlorinated benzene, and continuously distilling off water substantially as formed in the reaction.

19. In the preparation of glycerol dichlorohydrin, the step which consists in passing gaseous hydrogen chloride through a mixture of glycerol and liquid chlorinated benzene in the presence of catalytic amounts of acetic acid, continuously distilling off water substantially as formed in the reaction, together with glycerol dichlorohydrin, hydrogen chloride, and liquid chlorinated benzene, separating the organic constituents from said acid distillate, and returning them to the reaction zone.

EDGAR C. BRITTON.
ROY LYMAN HEINDEL.